(12) United States Patent
Huang

(10) Patent No.: US 8,974,853 B2
(45) Date of Patent: *Mar. 10, 2015

(54) TIRE DRESSING PASTE COMPOSITION

(71) Applicant: Illinois Tool Works, Inc., Glenview, IL (US)

(72) Inventor: Tsao-Chin Clarence Huang, Katy, TX (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/144,023

(22) Filed: Dec. 30, 2013

(65) Prior Publication Data

US 2014/0113079 A1    Apr. 24, 2014

Related U.S. Application Data

(63) Continuation of application No. 13/586,088, filed on Aug. 15, 2012, now Pat. No. 8,623,454.

(60) Provisional application No. 61/557,872, filed on Nov. 9, 2011.

(51) Int. Cl.
  *C09D 5/08* (2006.01)
  *C09D 183/08* (2006.01)
  *C09D 5/00* (2006.01)

(52) U.S. Cl.
  CPC ............. *C09D 5/008* (2013.01); *C09D 183/08* (2013.01)
  USPC ........... 427/140; 524/506; 524/860; 524/779; 524/780; 524/786; 524/701; 524/783

(58) Field of Classification Search
  None
  See application file for complete search history.

(56) References Cited

U.S. PATENT DOCUMENTS

| | | | | |
|---|---|---|---|---|
| 4,374,236 A | * | 2/1983 | Znaiden | 528/26.5 |
| 4,880,557 A | * | 11/1989 | Ohara et al. | 510/189 |
| 5,183,845 A | * | 2/1993 | Parkinson et al. | 524/726 |
| 5,378,271 A | * | 1/1995 | Arimoto et al. | 106/236 |
| 5,945,093 A | * | 8/1999 | Duvel | 424/70.12 |
| 6,221,833 B1 | * | 4/2001 | Colurciello, Jr. | 510/466 |
| 6,506,715 B1 | * | 1/2003 | Schultz et al. | 510/189 |
| 6,746,977 B2 | * | 6/2004 | Schultz et al. | 442/164 |
| 7,074,262 B2 | * | 7/2006 | Huang et al. | 106/3 |
| 7,368,147 B2 | * | 5/2008 | Bell | 427/140 |
| 2010/0024935 A1 | * | 2/2010 | Jubran et al. | 152/151 |

* cited by examiner

*Primary Examiner* — Robert S Loewe
(74) *Attorney, Agent, or Firm* — Blue Filament Law PLLC; Avery N. Goldstein

(57) ABSTRACT

A tire dressing composition is provided that includes at least one silicone fluid having a viscosity of between 40 and 500,000 centiStokes at room temperature. An amine functionalized silicone fluid having a viscosity of between 40 and 500,000 centiStokes at room temperature is also present. A thickener is present to yield a coating from the composition has limited sag, low tack upon coating formation, and desirable durability properties. An organic solvent is present in which the at least one silicone fluid and the amine functionalized silicone fluid are soluble or suspended. A process is provided for dressing a tire having a previous silicone coating thereon, the process including applying the tire dressing composition and allowing a solvent to evaporate from the composition to form a tire dressing coating. The coating producing an initial gloss of great than 200 units. A gloss of greater than 110 units is maintained for at least four weeks subsequent to the application under normal vehicle operation conditions.

16 Claims, No Drawings

US 8,974,853 B2

TIRE DRESSING PASTE COMPOSITION

RELATED APPLICATIONS

This application is a continuation of U.S. Utility application Ser. No. 13/586,088 filed Aug. 15, 2012, now U.S. Pat. No. 8,623,454; that in turn claims priority benefit to U.S. Provisional Application Ser. No. 61/557,872 filed on 9 Nov. 2011; the contents of which are hereby incorporated by reference.

FIELD OF THE INVENTION

The present invention in general relates to a tire dressing composition and the use thereof and in particular to such a thickened composition amenable to application to the tires of various vehicles to provide a durable, low-tack, high gloss protective coating.

BACKGROUND OF THE INVENTION

As the mileage on a tire increases, the sidewall rubber surfaces often become dull and unattractive. This is due to various causes including wind, weather, sunlight, scratching, abrasion from dirt, and other chemical and physical reactions. Many products are available today on the market for tire dressing usage to address these adverse effects. Many of these tire dressing products restore older appearance from a dull, weathered appearance to a shiny, bright, and like-new condition. For example, conventionally a dispersion of the silicone fluids in petroleum distillates or a conventional oil in water silicone emulsion system with milky or opaque appearance are often used to restore the attractive, bright, shiny, and like-new appearance on the tire surface. Typically conventional tire dressing formulas for dressing and appearance applications tend to have limited adhesion to the rubber of the tire. Ideally, a product has the long-term performance characteristics of being resistant to car wash detergents and weathering, such as rain and storm. Unfortunately, conventional products remain difficult for a consumer to apply and do not provide the balance of desired properties. To-date, tire dressing products have involved a trade-off of properties with low viscosity film forming polymers tending to be vulnerable to weathering, sag, and tack during drying; while higher molecular weight film forming polymers tend to be brittle and delaminate.

Thus, there exists a need for a tire dressing composition that is sufficiently viscous to be applied as a paste and has durability against weather and detergent. There also exists a need for a process to apply such a composition to provide a high gloss protective dressing coating to a tire surface.

SUMMARY OF THE INVENTION

A tire dressing composition is provided that includes at least one silicone fluid having a viscosity of between 40 and 500,000 centiStokes at room temperature. An amine functionalized silicone fluid having a viscosity of between 40 and 500,000 centiStokes at room temperature is also present. A thickener is present to yield a coating from the composition has limited sag, low tack upon coating formation, and desirable durability properties. An organic solvent is present in which the at least one silicone fluid and the amine functionalized silicone fluid are soluble or suspended.

A process is provided for dressing a tire having a previous silicone coating thereon, the process including applying the tire dressing composition and allowing a solvent to evaporate from the composition to form a tire dressing coating. The coating producing an initial gloss of greater than 200 units. A gloss of greater than 110 units is maintained for at least four weeks subsequent to the application under normal vehicle operation conditions.

DETAILED DESCRIPTION OF THE PREFERRED EMBODIMENTS

The present invention has utility as a thickened tire dressing composition and a process for a use thereof to protect and impart gloss and water repellency to a tire so treated. An inventive tire dressing composition forms a durable high gloss water repellant coating on a tire that is resistant to water and detergent exposure. A surprising attribute of the present invention is that through the inclusion of a thickener in combination with polydimethylsiloxane and amino-functionalized silicone polymers, a coating is produced from an inventive tire dressing composition has limited sag (synonymously referred to herein as "sling"), low tack upon coating formation, and desirable durability properties. The resulting coating also has superior adhesion to a silicone coating existing on the tire to which an inventive coating adheres.

The high molecular weight polydimethylsiloxane and high molecular weight reactive amino-functional silicone polymers of the present invention in combination deliver a high durability dressing coating. Both the high molecular weight polydimethylsiloxane and high molecular weight reactive amino-functional silicone polymers are essential requirements to deliver a high durability dressing coating. However, these polymers alone tend to form a tire dressing coating that is tacky and difficult to be used by consumers. The performance characteristics of an inventive tire dressing composition are further enhanced chemically and physically by adequately controlling the viscoelastic characteristics of the product through thickening. This balance is achieved through modifying the ratio between the elastic and viscous aspects of the composition.

Adequate thickening was used in this invention to completely eliminate the tackiness, to deliver excellent spreadability for easy/smooth application, and to achieve the desired uniform extremely high gloss dressing coating.

An inventive tire dressing composition is readily applied by a vehicle owner through resort to a convention trigger spray application, propellant aerosol, or a sponge or cloth for wipe application onto the tire surface.

An inventive tire dressing composition includes at least one silicone fluid having a viscosity of between 40 and 500,000 centiStokes, as measured at room temperature. Suitable silicone fluids operative herein illustratively include polydialkylsiloxanes where the alkyl is in each instance is $C_1$-$C_4$ such as polydimethylsiloxane, and the methyl groups along the chain can be substituted by many other groups, e.g., phenyl, vinyl, or trifluoropropyl. Representative silicone fluids operative herein and conventional to the art are detailed in the U.S. Pat. Nos. 6,602,835; 6,506,715; 6,221,833; 6,221,811; 6,180,117; 6,153,569; 6,147,078; 6,080,387; 6,071,975; 6,013,323; 5,759,983; 5,661,208; 5,623,017; 5,578,298; 5,525,427; 5,507,969; 5,378,271; 5,326,483; 5,244,598; 5,183,845; 5,077,040; 5,057,572; 4,999,398; 4,880,557; 4,790,877; 4,600,436; and 3,956,174. In a preferred embodiment, the at least one silicone fluid is a polydimethylsiloxane with a molecular weight of between 10,000 and 500,000 centiStokes. It is appreciated that the molecular weights and film forming properties silicone materials that vary in viscosity and molecular weight are operative to adjust the properties of a coating formed from an inventive composition. The at least one silicone fluid of an inventive tire dressing composition is typically present in the composition in an amount of between 30 and 70 total weight percent and preferably between 35 and 62 total weight percent.

An amine functionalized silicone polymer is provided in an inventive composition The amine functionalized silicone polymer is reactive with the polydimethylsiloxane and moieties extending from the tire surface. Amine functionalized silicone polymers operative herein include those polymers that have both terminal and pendant amine groups. The amine groups being primary or secondary amines of the formula —$NH_2$ or $NHR^1$, where $R^1$ is $C_1$-$C_6$ alkyl, $C_1$-$C_6$ fluoroalkyl, $C_1$-$C_6$, perfluoroalkyl, $C_6$-$C_8$ aryl, and $C_1$-$C_6$ alkyl alcohol. Amine functionalized silicone polymers operative herein illustratively include cyclic poly(diorganosiloxane)s; poly (diorganosiloxane)s; the polydimethylsiloxanes detailed above with the proviso that at least two amine groups are present per polymer chain. The amine functionalized silicone polymers operative herein have a viscosity of between 40 and 500,000 centiStokes, as measured at room temperature. The amine functionalized silicone polymer is typically present in the composition in an amount of between 1 and 20 total weight percent and preferably between 2 and 11 total weight percent.

In order to improve properties in a dressing produced by an invention composition, a metal salt or polymeric thickener is present in the composition. A metal salt thickener operative herein has the formula:

$$Q\text{-}M^{Z+}OC(O)R^2 \qquad (I)$$

where $R^2$ is $C_2$-$C_{24}$ alkyl, $C_2$-$C_{24}$ fluoroalkyl, $C_2$-$C_{24}$ perfluoroalkyl, $C_2$-$C_{24}$ alkenyl, $C_2$-$C_{24}$ fluoroalkenyl, $C_2$-$C_{24}$ perfluoroalkenyl, and $C_6$-$C_{10}$ aryl; M is a main group or transition group metal; Z is an integer of 2 or 3; and Q is oxo, or hydroxyl to satisfy the charge M. By way of example, a thickener (I) is a salt of Ca, Mg, B, Al, or Zn. Specific thickeners (I) illustratively include oxoaluminum octanoate, oxoaluminum acrylate, and hydroxylcalcium stearate. A thickener (I) is typically present in the composition in an amount of between 0.05 and 5 total weight percent and preferably between 0.1 and 1 total weight percent.

A polymeric thickener operative herein is a block copolymer. Polymeric thickeners operative herein include SEBS, SEP, SEB, EP, SBS, SB, and SIS, where E is a polyethylene segments, S is a polystyrene segment, B is a polybutylene or polybutadiene segment, I is a polyisoprene segment, and P is a polypropylene segment. The polymeric thickener is optionally bonded to colloidal particles, such as styrene beads or silica. By way of example, a SEBS-styrene particle thickener is commercially available under the tradename KRATON G®. Typical KRATON G® polymers consists of block segments of styrene monomer units and rubber monomer units. Each block segment may consist of 100 monomer units or more. A polymeric thickener is typically present in the composition in an amount of between 0.05 and 5 total weight percent and preferably between 0.1 and 1 total weight percent, these amounts not considering the amount of colloidal particulate that is optionally present. Such colloidal particles, when present, are typically used at a weight ratio relative to the polymer of between 0-5:1 (particulate:thickening polymer). It is appreciated that a thickener (I) and a polymeric thickener are readily used in combination within the same inventive composition and at the same total loading as either type alone, namely 0.05 to 5 total weight percent.

The various inventive composition components are required to form a suspension or solution with an organic solvent and preferably a VOC exempt organic solvent such as a chemical compound or mixture that contains at least one carbon atom and meets one of the following: (1) has a vapor pressure less than 0.1 mmHg at 20° C., as determined by ARB Method 310; or (2) is a chemical compound with more than 12 carbon atoms, or a chemical mixture comprised solely of compounds with more than 12 carbon atoms, and the vapor pressure is unknown; or (3) is a chemical compound with a boiling point greater than 216° C. as determined by ARB Method 310; or (4) is the weight percent of a chemical mixture that boils above 216° C., as determined by ARB Method 310.

An inventive tire dressing composition optionally includes a defoaming agent in an amount present to inhibit blister formation in a tire surface dress coating so produced by the inventive composition. Silicone defoamer agents operative herein illustratively include silicone based defoamers, mineral oil based defoamers, and mixtures of foam destroying polymers and hydrophobic solids such as polyureas, as are known to the art. Specific exemplary silicone based defoamers illustratively include silica-filled polydimethylsiloxane and polyether-modified polysiloxanes.

Inventive tire dressing composition optionally includes a surfactant present in an amount to reduce surface tension of the inventive tire dressing composition to an extent such that the composition is able to wet the tire surface. Surfactants operative herein illustratively include nonionic polymeric fluorinated surfactants, anionic phosphonated fluorinated surfactants, nonionic ethoxylated fluorinated surfactants, polyether modified polydimethylsiloxane, polyether modified polymethylalkylsiloxane, aralkyl modified polymethylalkylsiloxane, polyester modified hydroxyl functional polydimethylsiloxane, acryl functional polyester modified polydimethylsiloxane, polyether polyester modified hydroxyl functional polydimethylsiloxane, solution of polyacrylate, solution of a fluoro modified polyacrylate.

An inventive tire dressing composition also optionally includes a pigment such as iron oxide, mica, titanium dioxide, stannic oxide, metallic glitter particles such as pigmented polyethylene terehthalate, cut metalized foils such as aluminized PVC film or the like; organic dyes; fragrances; corrosion inhibitors illustratively including triethanolamine dinonylnaphthalene, boric acid-triethanolamine salt, phosphoric acid-triethanolamine salt, ammonia, triethanolamine, capryloamphoprionate, and mixtures thereof; plasticizers; antimicrobials; and combinations thereof. Typical and preferred formulations according to the present invention are provided in Table 1.

TABLE 1

Inventive Thickened Tire Dressing Composition
(amounts in total weight)

| Ingredient | Typical | Preferred |
|---|---|---|
| Silicone Fluid e.g. 100,000 CST polydimethylsiloxane | 30-70 | 35-62 |
| Amino functionalized silicone fluid | 1-20 | 2-11 |
| Thickener (I)/polymeric thickener | 0.05-5 | 0.1-1 |
| Defoamer | 0-1 | 0.01-0.5 |
| Surfactant | 0-5 | 0.1-3 |
| Pigment | 0-3 | 0-1 |
| Dye | 0-1 | 0-0.5 |
| Fragrance | 0-1 | 0-0.5 |
| Antimicrobial | 0-1 | 0-0.2 |
| Anticorrosion | 0-2 | 0-1 |
| Solvent (e.g. pet. distillate) | to 100% | to 100% |

The present invention is further detailed with respect to the following nonlimiting examples that are provided to further illustrate the preparation of inventive compositions and certain attributes associated with the resulting coatings on tire surfaces.

EXAMPLE 1

Using TRICOR systems model 806H hand-held surface analysis system, a tire gloss calibration was performed on all four tires of four different vehicles. These vehicles and the specific tires mounted thereon included 1999 Ford F-250 Pickup Truck (BF Goodrich LT235/85R16-120/116Q); 1996 Ford E-150 Van (Arizonian Silver Edition P235/75R15-105S); 2000 Ford Contour (Kumho P185170R1487TM+S); 1999 Nissan Ultima (Yokohama YK520P195/65R15-91H). Baseline gloss values for each of the tires of the four test vehicles were measured seven times for each vehicle in TRICOR gloss units. For the 28 measurements of gloss used as a baseline for each vehicle, statistics were generated indicating an average pretreatment gloss of 15.04±2.19 with a coefficient of variation of 14.55% and a range of 8.5.

The following generation of baseline values, an inventive tire dressing composition including 51 total weight percent of 100,000 centiStokes silicone fluid, 5 weight percent 30,000 centiStokes methoxy terminated reactive amino functionalized silicone fluid that contains both primary and secondary amine functionality, 0.23% oxoaluminum acrylate as a thickener (I), and, 0.1% cherry fragrance.

As a comparative example, the same formulation lacking the thickener (I) is also applied to the four test vehicle tires randomized based on tire location on the vehicles. Quadruple gloss measurements are taken immediately upon coating formation on the vehicle tires and once a week for the next 11 weeks. The results are summarized in Table 2.

TABLE 2

Average gloss measurement in TRICOR Gloss Units

|  | Inventive Composition | Comparative Composition (w/o thickener) |
| --- | --- | --- |
| As applied | 212.0 ± 7.7 | 183.0 ± 0.0 |
| Week 1 | 192.75 ± 2.9 | 169.0 ± 2.9 |
| Week 2 | 161.5 ± 5.3 | 132.5 ± 7.9 |
| Week 3 | 140.0 ± 3.5 | 102.3 ± 14.0 |
| Week 4 | 110.3 ± 1.7 | 74.3 ± 12.5 |
| Week 5 | 92.0 ± 2.2 | 51.5 ± 8.3 |
| Week 6 | 71.3 ± 0.5 | 30.3 ± 1.0 |
| Week 7 | 51.5 ± 1.7 | 15.8 ± 0.5 |
| Week 8 | 41.5 ± 2.4 | — |
| Week 9 | 33.25 ± 1.3 | — |
| Week 10 | 27.0 ± 0 | — |
| Week 11 | 13.75 ± 1.7 | — |

The results of the statistical analysis of this data summarized in Table 2 shows both a higher initial gloss to the inventive composition coating and a longer duration of coating adhesion, as compared to the comparative composition lacking the oxoaluminum acrylate polymer. In fact, the comparative composition testing was terminated after week seven because the average gloss value had reverted to baseline values based on the quadruple measurements from each of the four vehicles.

Patents and publications mention the specification are indicative of the levels of those skilled in the art to which the invention pertains. These patents and publications are incorporated herein by reference to the same extent as if each individual patent or publication was specifically and individually incorporated herein by reference.

The forgoing description is illustrative of particular embodiments of the invention, but is not meant to be a limitation upon the practice thereof. The following claims, including all equivalents thereof are intended to define the scope of the invention.

The invention claimed is:

1. A tire dressing composition comprising:
   at least one silicone fluid having a viscosity of between 40 and 500,000 centiStokes at room temperature;
   an amine functionalized silicone fluid having a viscosity of between 40 and 500,000 centiStokes at room temperature;
   a block copolymer thickener; and
   a VOC exempt organic solvent present from 19.3-62.8% in which said at least one silicone fluid and said amine functionalized silicone fluid are soluble or suspended, the tire dressing composition lacking tackiness and forming a high gloss dressing coating.

2. The composition of claim 1 wherein said thickener is present from 0.05 to 5 total weight percent.

3. The composition of claim 1 wherein said at least one silicone fluid is a polydimethyl siloxane.

4. The composition of claim 1 wherein said at least one silicone fluid comprises a first silicone fluid having a first silicone fluid viscosity of between 10,000 and 500,000 centiStokes.

5. The composition of claim 1 wherein said at least one silicone fluid is a polydimethyl siloxane.

6. The composition of claim 1 wherein said at least one silicone fluid is present from 30 to 70 total weight percent.

7. The composition of claim 1 wherein said amine functionalized is present from 1 to 20 total weight percent.

8. The composition of claims 1 wherein said amine functionalized silicone fluid is has a viscosity of between 40 and 500,000 centiStokes and having at least two amine groups are present per polymer chain of said amine functionalized silicone fluid.

9. The composition of claim 1 wherein said amine functionalized silicone fluid is a primary amine functionalized silicone fluid.

10. The composition of claim 1 wherein said thickener comprises at least one copolymer of SEBS, SEP, SEB, EP, SBS, SB, or SIS;
   where E is a polyethylene segment, S is a polystyrene segment, B is a polybutylene or polybutadiene segment, I is a polyisoprene segment, and P is a polypropylene segment.

11. A tire dressing composition comprising:
   at least one silicone fluid having a viscosity of between 40 and 500,000 centiStokes at room temperature;
   an amine functionalized silicone fluid having a viscosity of between 40 and 500,000 centiStokes at room temperature;
   a thickener having the formula:

$$Q\text{-}M^{Z+}OC(O)R^2 \quad (I)$$

where $R^2$ is $C_2$-$C_{24}$ alkyl, $C_2$-$C_{24}$ fluoroalkyl, $C_2$-$C_{24}$ perfluoroalkyl, $C_2$-$C_{24}$ alkenyl, $C_2$-$C_{24}$ fluoroalkenyl, $C_2$-$C_{24}$ perfluoroalkenyl, and $C_6$-$C_{10}$ aryl; M is a main group or transition group metal; Z is an valence integer of 2 or 3; and Q is oxo, or hydroxyl to satisfy the valence integer; and
   a VOC exempt organic solvent present from 19.3-62.8% in which said at least one silicone fluid and said amine functionalized silicone fluid are soluble or suspended, the tire dressing composition lacking tackiness and forming a high gloss dressing coating.

12. The composition of claim 11 where M is Ca, Mg, B, Al, or Zn.

13. The composition of claim 12 where $R^2$ is $C_6$-$C_{24}$ alkyl.

14. A tire dressing composition comprising:
at least one silicone fluid having a viscosity of between 40 and 500,000 centiStokes at room temperature;
an amine functionalized silicone fluid having a viscosity of between 40 and 500,000 centiStokes at room temperature;
a thickener comprising at least one copolymer of SEBS, SEP, SEB, EP, SBS, SB, or SIS;
where E is a polyethylene segment, S is a polystyrene segment, B is a polybutylene or polybutadiene segment, I is a polyisoprene segment, and P is a polypropylene segment; and
a VOC exempt organic solvent in which said at least one silicone fluid and said amine functionalized silicone fluid are soluble or suspended, said copolymer further comprises colloidal particles bonded to said copolymer.

15. A process of dressing a tire surface comprising:
applying a composition to the tire surface, said composition comprising: at least one silicone fluid having a viscosity of between 40 and 500,000 centiStokes at room temperature; an amine functionalized silicone fluid having a viscosity of between 40 and 500,000 centiStokes at room temperature; a block copolymer thickener; and a VOC exempt organic solvent present from 19.3-62.8% in which said at least one silicone fluid and said amine functionalized silicone fluid are soluble or suspended; and
allowing said composition to dry to dress the tire surface to a shine of greater than 200 gloss units, the dressing lacking tackiness and having a high gloss.

16. The process of claim 15 further comprising maintaining a durability shine of greater than 110 gloss units four weeks after said allowance to dry step.

* * * * *